(12) United States Patent
Jiang et al.

(10) Patent No.: US 12,276,725 B2
(45) Date of Patent: Apr. 15, 2025

(54) OPTIMIZATION METHOD AND APPARATUS FOR INTERFEROMETRIC SYNTHETIC APERTURE RADAR (INSAR) TIME-SERIES PHASE

(71) Applicant: Sun Yat-sen University, Guangdong (CN)

(72) Inventors: Mi Jiang, Guangdong (CN); Xiao Cheng, Guangdong (CN); Qi Liang, Guangdong (CN)

(73) Assignee: Sun Yat-sen University, Guangzhou (CN)

( * ) Notice: Subject to any disclaimer, the term of this patent is extended or adjusted under 35 U.S.C. 154(b) by 374 days.

(21) Appl. No.: 17/962,545

(22) Filed: Oct. 10, 2022

(65) Prior Publication Data

US 2023/0236311 A1    Jul. 27, 2023

Related U.S. Application Data

(63) Continuation-in-part of application No. PCT/CN2022/077183, filed on Feb. 22, 2022.

(30) Foreign Application Priority Data

Jan. 26, 2022    (CN) .......................... 202210097356.6

(51) Int. Cl.
 *G01S 13/90*    (2006.01)
(52) U.S. Cl.
 CPC ................................ *G01S 13/9023* (2013.01)
(58) Field of Classification Search
 CPC ................................................... G01S 13/9023
 See application file for complete search history.

(56) References Cited

FOREIGN PATENT DOCUMENTS

CN    112986993 A  *  6/2021  ............. G01B 15/06

OTHER PUBLICATIONS

Jiang, The potential of more accurate InSAR covariance matrix estimation for land cover mapping, ISPRS Journal of Photogrammetry and Remote Sensing, vol. 126, 2017 (Year: 2017).*

* cited by examiner

*Primary Examiner* — Vladimir Magloire
*Assistant Examiner* — Bongani Jabulani Mashele

(57) ABSTRACT

Disclosed are an optimization method and apparatus for an Interferometric Synthetic Aperture Radar (InSAR) time-series phase. The optimization method includes: obtaining a time-series SAR data set, and performing registration and L-looks processing on the time-series SAR data set to obtain an L-looks intensity data set and an interferometric data set respectively; taking the L-looks intensity data set as a reference, obtaining a preset digital elevation model (DEM) and a preset land cover image, performing registration and geocoding on the preset DEM to obtain a digital elevation in a SAR image coordinate system, and performing registration and geocoding on the preset land cover image to obtain a land cover image in the SAR image coordinate system; performing a differential operation on the interferometric data set to obtain a differential interferometric data set; and estimating a covariance matrix at each spatial pixel position, and estimating and obtaining an optimized time-series phase.

10 Claims, 5 Drawing Sheets

OPTIMIZATION METHOD AND APPARATUS FOR INTERFEROMETRIC SYNTHETIC APERTURE RADAR (INSAR) TIME-SERIES PHASE

CROSS REFERENCE TO RELATED APPLICATIONS

The present application is a Continuation-In-Part Application of PCT Application No. PCT/CN2022/077183 filed on Feb. 22, 2022, which claims the benefit of Chinese Patent Application No. 202210097356.6 filed on Jan. 26, 2022. All the above are hereby incorporated by reference in their entirety.

TECHNICAL FIELD

The present disclosure relates to the technical field of Interferometric Synthetic Aperture Radar (InSAR), and in particular, to an optimization method and apparatus for an InSAR time-series phase.

BACKGROUND

With the gradual increase of a re-entry frequency of a contemporary synthetic aperture radar (SAR) satellite, massive observation data not only provides an opportunity to understand the development trend and law of deformation more objectively, but also brings a new challenge to fast and efficient time-series InSAR. In particular, for TOPS data of Sentinel-1 with a re-entry cycle of 6 to 12 days and a breadth of up to 200 km*250 km in the Global Monitoring for Environment and Security (GMES) of the European Space Agency (ESA), traditional data processing methods are often difficult to meet monitoring timeliness requirements.

As one of the most critical steps in InSAR data processing, wide-range time-series phase optimization can resist radar signal decorrelation and enhance an interferometric signal-to-noise ratio, so as to achieve high-quality process control and reduce unwrapping error propagation. At present, there are two types of mainstream time-series phase optimization methods. Represented by the small baseline technology, one type of mainstream time-series phase optimization method considers only spatial information and filters interferograms one by one by using Goldstein and other noise reduction methods. However, this method ignores image details and degrades spatial resolution. As a result, this method increases a deviation in exchange for accuracy improvement. Therefore, the technologies represented by small baseline subsets (SBAS) are often efficient in wide-range time-series InSAR deformation monitoring, but they cannot achieve fine monitoring and have low reliability. Represented by the SqueeSAR technology, the other type of mainstream time-series phase optimization method gives consideration to space-time information, and based on an assumption that ground objects of a same type have similar backscattering attributes, uses the Kolmogorov Smirnov (KS) test and the Broyden Fletcher Goldfarb Shanno (BFGS) phase triangulation algorithm to optimize a time-series phase. This method can take into account the image details, but it needs to search for targets of a same type pixel by pixel for a single look complex (SLC) image sequence to meet a hypothetical premise of a statistical model. Therefore, the technologies represented by the SqueeSAR technology are very time-consuming and difficult for large-scale deformation monitoring.

Therefore, there is still a room for an efficient and high-precision optimization method for the InSAR time-series phase to resolve the problem that there is no efficient and high-precision InSAR time-series phase optimization method in the prior art.

SUMMARY

The present disclosure provides an optimization method and apparatus for an InSAR time-series phase, to resolve a technical issue that there is no efficient and high-precision time-series phase optimization method in the prior art.

In order to resolve the above technical issue, an embodiment of the present disclosure provides an optimization method for an InSAR time-series phase, including:
  obtaining a time-series SAR data set, and performing registration and L-looks processing on the time-series SAR data set to obtain an L-looks intensity data set and an interferometric data set respectively; taking the L-looks intensity data set as a reference, obtaining a preset digital elevation model (DEM) and a preset land cover image, performing registration and geocoding on the preset DEM to obtain a digital elevation in a SAR image coordinate system, and performing registration and geocoding on the preset land cover image to obtain a land cover image in the SAR image coordinate system; performing a differential operation on the interferometric data set based on the digital elevation in the SAR image coordinate system to obtain a differential interferometric data set; and estimating a covariance matrix of the time-series SAR data set at each spatial pixel position based on the land cover image in the SAR image coordinate system and the differential interferometric data set, and estimating and obtaining an optimized time-series phase according to a preset maximum likelihood estimator for a time-series phase.

It can be understood that after the time-series SAR data set is obtained, L-looks processing is performed on the time-series SAR data set. Compared the prior art, the method in the present disclosure converts an existing SLC data set into an L-looks data set, such that workspace occupied for L-looks data input and parameter output is far less than that in the case of a single look, which can greatly reduce a volume of the data set; and estimates the covariance matrix of the time-series SAR data set based on the obtained land cover image in the SAR image coordinate system, which greatly improves operation efficiency and avoids the estimation through selection of statistically homogeneous samples in the case of the single look (L=1) in the prior art.

As a preferred solution, the obtaining a time-series SAR data set, and performing registration and L-looks processing on the time-series SAR data set to obtain an L-looks intensity data set and an interferometric data set respectively specifically includes:
  obtaining a time-series SAR data set with n time-series SAR single-look images, registering the n time-series SAR single-look images, performing L-looks processing on the registered n time-series SAR single-look images, and obtaining n SAR intensity images and $n(n-1)/2$ interferometric data sets, where n is a positive integer greater than 1.

It can be understood that after the time-series SAR data set with the n time-series SAR single-look images is obtained, registration and L-looks processing are performed on the time-series SAR data set, which can improve accuracy of the SAR intensity sequence and the interferometric data set that are obtained after L-looks processing, and avoid subsequent processing for the time-series SAR single-look images. A multi-looks data set obtained after L-looks processing can greatly reduce a volume of a to-be-processed data set.

As a preferred solution, the taking the L-looks intensity data set as a reference, obtaining a preset DEM and a preset land cover image, performing registration and geocoding on the preset DEM to obtain a digital elevation in a SAR image coordinate system, and performing registration and geocoding on the preset land cover image to obtain a land cover image in the SAR image coordinate system specifically includes:

taking the L-looks intensity data set as the reference, and using a preset cross-correlation maximization algorithm to co-register the preset DEM and the L-looks intensity data set, and then transforming the DEM into a SAR image coordinate system to obtain the digital elevation; and analogously, perform registration and geocoding on the preset satellite orbit data information and the preset land cover image to obtain the land cover image in the SAR image coordinate system.

It can be understood that when the L-looks intensity data set is taken as the reference, performing registration and geocoding on the preset DEM and a SAR intensity image in the L-looks intensity data set can improve accuracy of terrain description, and performing registration and geocoding on the preset satellite orbit data information and the preset land cover image can provide a reference pixel for the subsequent step of estimating the covariance matrix of the time-series SAR data set, which avoids the method of selecting the homogeneous samples in the case of the single look in the prior art, thereby improving overall calculation efficiency.

As a preferred solution, the performing a differential operation on the interferometric data set based on the digital elevation in the SAR image coordinate system to obtain a differential interferometric data set specifically includes:

performing a differential operation on the n(n−1)/2 interferometric data sets based on the digital elevation in the SAR image coordinate system to obtain n(n−1)/2 differential interferometric data sets, where pixel positions of the differential interferometric data sets correspond to those of the land cover image in the SAR image coordinate system in a one-to-one manner.

It can be understood that the differential operation is performed the interferometric data set based on the digital elevation in the SAR image coordinate system, which can eliminate a contribution of a terrain phase and effectively improve accuracy of an interferometric phase. In addition, pixel positions of the obtained differential interferometric data sets correspond to those of the land cover image in the SAR image coordinate system in the one-to-one manner. In this way, in the subsequent step of estimating the covariance matrix of the time-series SAR data set, statistics can be accurately performed on pixels with a same category marker as a central pixel in a window, and the overall calculation efficiency is also improved compared with the prior art.

As a preferred solution, the estimating a covariance matrix of the time-series SAR data set at each spatial pixel position based on the land cover image in the SAR image coordinate system and the differential interferometric data set specifically includes:

establishing a sliding window for each spatial pixel position of the image sequentially, marking a pixel with a same attribute as a preset reference pixel in the sliding window sequentially based on the land cover image in the SAR image coordinate system, so as to sequentially collect statistics on pixels with a same category marker as a central pixel in the sliding window, and calculating the covariance matrix. It can be understood that, in the step of estimating the covariance matrix of the time-series SAR data set, without using a traditional step of processing distributed target data, in which statistically homogeneous samples are selected by using a hypothesis test in the single-look SAR intensity images, the pixel that has a same attribute (land cover) as the reference pixel in the current sliding window is marked by using the land cover image in the SAR image coordinate system, and pixels with a same category marker, namely, homogeneous pixels, are used to estimate each element of the covariance matrix, which greatly improves the operation efficiency and has obvious advantages in efficient operation.

As a preferred solution, the estimating and obtaining the optimized time-series phase according to the preset maximum likelihood estimator for a time-series phase specifically includes:

estimating and obtaining the optimized time-series phase according to the preset maximum likelihood estimator for the time-series phase, namely, $$\hat{\theta} = \arg\min_{\theta}\{\Re(\xi^H(|\Sigma|^{-1}\circ\Sigma)\xi)\}, \text{ where } \xi = e^{j\theta}$$

where $\hat{\theta}$ represents the optimized time-series phase, $\theta$ represents a truth of the time-series phase, $\Re(\cdot)$ represents a real part operator, e represents a natural constant, j represents an imaginary number unit, H represents conjugate transposition, and $\Sigma$ represents the covariance matrix of the time-series SAR data set.

It can be understood that based on the preset maximum likelihood estimator for the time-series phase and the covariance matrix of the time-series SAR data set, the optimized time-series phase can be accurately estimated, thereby further improving accuracy of SAR time-series phase optimization.

Correspondingly, the present disclosure further provides an optimization apparatus for an InSAR time-series phase, including an L-looks processing module, a registration and coding module, a differential operation module, and a time-series phase optimization module, where the L-looks processing module is configured to obtain a time-series SAR data set, and perform registration and L-looks processing on the time-series SAR data set to obtain an L-looks intensity data set and an interferometric data set respectively;

the registration and coding module is configured to take the L-looks intensity data set as a reference, obtain a preset DEM and a preset land cover image, perform registration and geocoding on the preset DEM to obtain a digital elevation in a SAR image coordinate system, and perform registration and geocoding on the preset land cover image to obtain a land cover image in the SAR image coordinate system;

the differential operation module is configured to perform a differential operation on the interferometric data set based on the digital elevation in the SAR image coordinate system to obtain a differential interferometric data set; and the time-series phase optimization module is configured to estimate a covariance matrix of the time-series SAR data set at each spatial pixel position based on the land cover image in the SAR image coordinate system and the differential interferometric data set, and estimate and obtain an optimized time-series phase according to a preset maximum likelihood estimator for a time-series phase.

As a preferred solution, when configured to obtain a time-series SAR data set, and perform registration and L-looks processing on the time-series SAR data set to obtain an L-looks intensity data set and an interferometric data set respectively, the L-looks processing module is specifically configured to:

obtain a time-series SAR data set with n time-series SAR single-look images, register the n time-series SAR single-look images, perform L-looks processing on the registered n time-series SAR single-look images, and obtain n SAR intensity images and n(n−1)/2 interferometric data sets, where n is a positive integer greater than 1.

As a preferred solution, when configured to take the L-looks intensity data set as a reference, obtain a preset DEM and a preset land cover image, perform registration and geocoding on the preset DEM to obtain a digital elevation in a SAR image coordinate system, and perform registration and geocoding on the preset land cover image to obtain a land cover image in the SAR image coordinate system, the registration and coding module is specifically configured to:

take the L-looks intensity data set as the reference, and use a preset cross-correlation maximization algorithm to co-register the preset DEM and the L-looks intensity data set, and then transform the DEM into a SAR image coordinate system to obtain the digital elevation; and analogously, perform registration and geocoding on the preset satellite orbit data information and the preset land cover image to obtain the land cover image in the SAR image coordinate system.

As a preferred solution, when configured to perform a differential operation on the interferometric data set based on the digital elevation in the SAR image coordinate system to obtain a differential interferometric data set, the differential operation module is specifically configured to:

perform a differential operation on the n(n−1)/2 interferometric data sets based on the digital elevation in the SAR image coordinate system to obtain n(n−1)/2 differential interferometric data sets, where pixel positions of the differential interferometric data sets correspond to those of the land cover image in the SAR image coordinate system in a one-to-one manner.

As a preferred solution, when configured to estimate a covariance matrix of the time-series SAR data set at each spatial pixel position based on the land cover image in the SAR image coordinate system and the differential interferometric data set, the time-series phase optimization module is specifically configured to:

establish a sliding window for each spatial pixel position of the image sequentially, mark a pixel with a same attribute as a preset reference pixel in the sliding window sequentially based on the land cover image in the SAR image coordinate system, so as to sequentially collect statistics on pixels with a same category marker as a central pixel in the sliding window, and calculate the covariance matrix.

As a preferred solution, when configured to estimate and obtain an optimized time-series phase according to a preset maximum likelihood estimator for a time-series phase, the time-series phase optimization module is specifically configured to:

estimate and obtain the optimized time-series phase according to the preset maximum likelihood estimator for the time-series phase, namely, $$\hat{\theta} = \arg\min_{\theta}\{\Re(\xi^H(|\Sigma|^{-1}\circ\Sigma)\xi)\},$$

where $\xi=e^{j\theta}$;

where $\hat{\theta}$ represents the optimized time-series phase, $\theta$ represents a truth of the time-series phase, $\Re(\cdot)$ represents a real part operator, e represents a natural constant, j represents an imaginary number unit, H represents conjugate transposition, and $\Sigma$ represents the covariance matrix of the time-series SAR data set.

DETAILED DESCRIPTION

The technical solutions in the embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
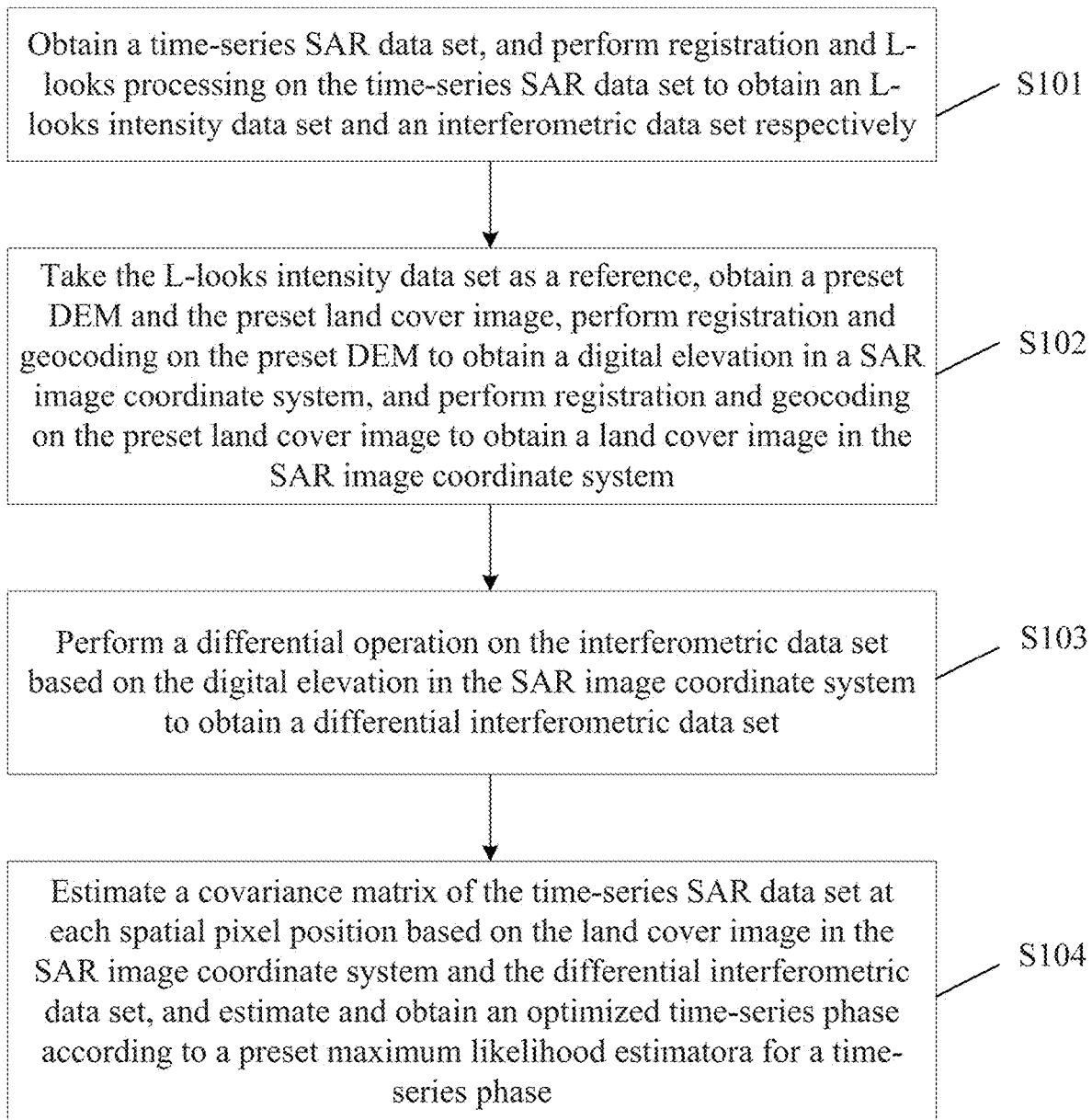
FIG. 1 is a flowchart showing steps of an optimization method for an InSAR time-series phase according to an embodiment of the present disclosure.
Figure 2:
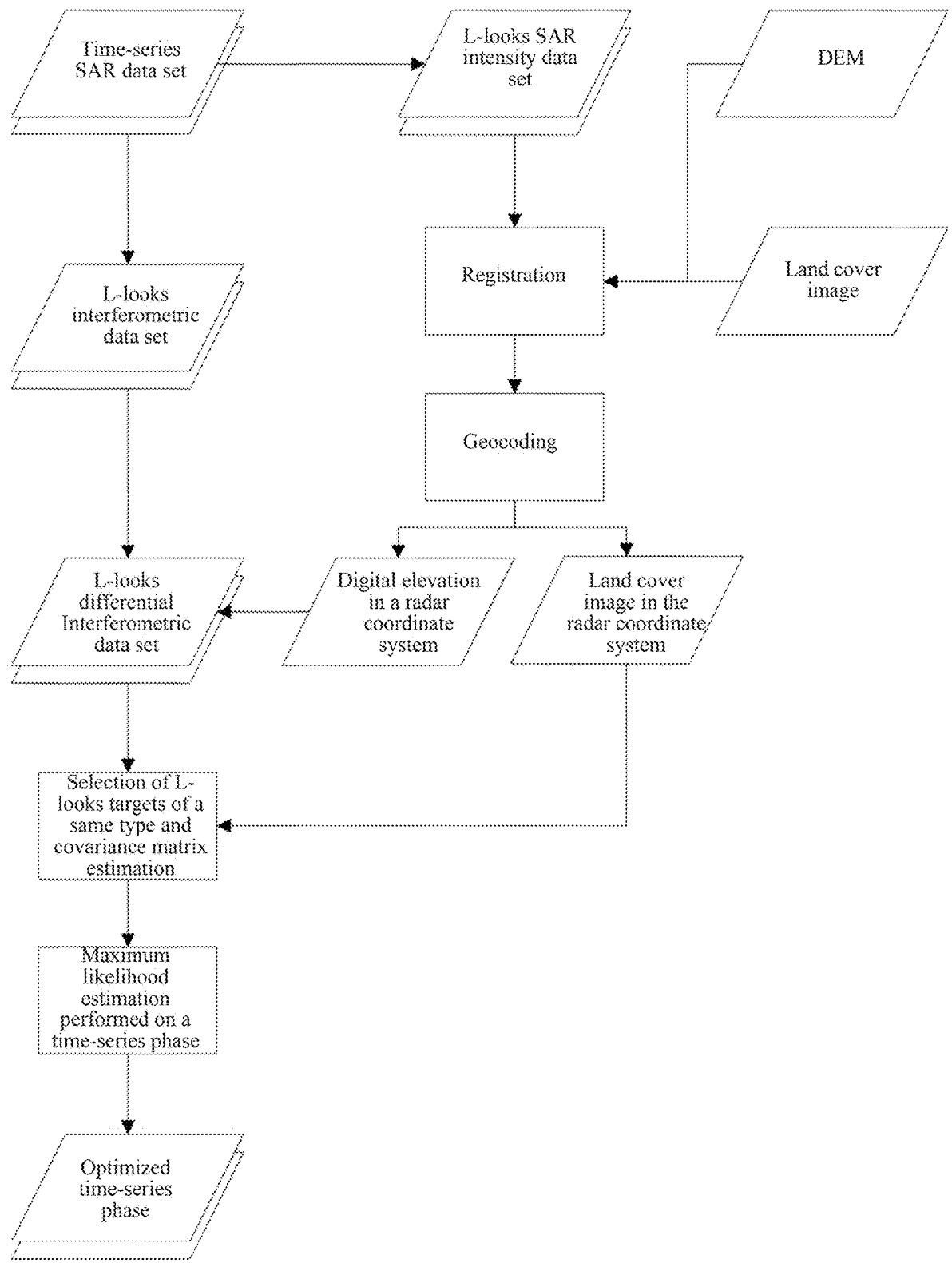
FIG. 2 is a schematic flowchart of an optimization method for an InSAR time-series phase according to an embodiment of the present disclosure.

Referring to FIG. 1 and FIG. 2, an optimization method for an InSAR time-series phase according to an embodiment of the present disclosure includes the following steps S101 to S104.

S101: Obtain a time-series SAR data set, and perform registration and L-looks processing on the time-series SAR data set to obtain an L-looks intensity data set and an interferometric data set respectively.

Specifically, a time-series SAR data set with n time-series SAR single-look images is obtained, the n time-series SAR single-look images are registered, L-looks processing is performed on the registered n time-series SAR single-look images, and n SAR intensity images and n(n−1)/2 interferometric data sets are obtained, where n is a positive integer greater than 1.

It should be noted that, preferably, the obtained time-series SAR data set with the n time-series SAR single-look images is SAR data of Sentinel-1. After registration, L-looks processing is performed on the time-series SAR data set to obtain the n SAR intensity images and the n(n−1)/2 interferometric data sets. A look quantity L is determined based on an actual need. Preferably, in this embodiment, the look quantity L is determined by resolution of a preset land cover image in step S102. Spatial resolution of the SAR data of Sentinel-1 is about 20 m*5 m (azimuth direction*distance direction). Therefore, for a 20 m preset land cover image, L=1*5 looks. As an earth observation satellite in the GMES of the ESA, Sentinel-1 consists of two satellites and carries a C-band SAR, and can provide continuous images, including but not limited to image data information of daytime, night and various weather.

It can be understood that after the time-series SAR data set with the n time-series SAR single-look images is obtained, registration and L-looks processing are performed on the time-series SAR data set, which can improve accuracy of the SAR intensity images and the interferometric data set that are obtained after L-looks processing, and avoid subsequent processing for the time-series SAR single-look images. A multilooked data set obtained after L-looks processing can greatly reduce a volume of a to-be-processed data set.

S102: Take the L-looks intensity data set as a reference, obtain a preset DEM and the preset land cover image, perform registration and geocoding on the preset DEM to obtain a digital elevation in a SAR image coordinate system, and perform registration and geocoding on the preset land cover image to obtain a land cover image in the SAR image coordinate system.

Specifically, the L-looks intensity data set is taken as the reference, and a preset cross-correlation maximization algorithm is used to co-register the preset DEM and the L-looks intensity data set, and then transform the DEM into a SAR image coordinate system to obtain the digital elevation; and analogously, perform registration and geocoding on the preset satellite orbit data information and the preset land cover image to obtain the land cover image in the SAR image coordinate system.

It should be noted that the preset cross-correlation maximization algorithm is insensitive to noise and achieves accurate position matching, while the DEM realizes digital simulation of a ground terrain based on limited terrain elevation data, in other words, digital expression of a terrain surface morphology. After registration and geocoding are performed on the preset DEM and the L-looks intensity data set, the digital elevation in the SAR image coordinate system can be obtained. Preferably, in this embodiment, the preset satellite orbit data information is provided by Sentinel-1, and the preset land cover image reflects a state of the earth's surface. The land cover image in the SAR image coordinate system can be obtained by performing registration and geocoding on the satellite orbit data information and the preset land cover image.

It can be understood that when the L-looks intensity data set is taken as the reference, performing registration and geocoding on the preset DEM and a SAR intensity image in the L-looks intensity data set can improve accuracy of terrain description, and performing registration and geocoding on the preset satellite orbit data information and the preset land cover image can provide a reference pixel for the subsequent step of estimating the covariance matrix of the time-series SAR data set, which avoids the method of selecting homogeneous samples in the case of a single look in the prior art, thereby improving overall calculation efficiency.

S103: Perform a differential operation on the interferometric data set based on the digital elevation in the SAR image coordinate system to obtain a differential interferometric data set.

Specifically, a differential operation is performed on the n(n−1)/2 interferometric data sets based on the digital elevation in the SAR image coordinate system to obtain n(n−1)/2 differential interferometric data sets, where pixel positions of the differential interferometric data sets correspond to those of the land cover image in the SAR image coordinate system in a one-to-one manner.

It should be noted that the differential operation is performed on the n(n−1)/2 interferometric data sets to eliminate a contribution of a terrain phase, that is, to perform terrain removal and phase unwrapping on the interferometric data sets, which is helpful to improve a deformation monitoring capability of InSAR, so as to obtain the n(n−1)/2 differential interferometric data sets.

It can be understood that the differential operation is performed the interferometric data set based on the digital elevation in the SAR image coordinate system, which can eliminate the contribution of the terrain phase and effectively improve accuracy of an interferometric phase. In addition, pixel positions of the obtained differential interferometric data sets correspond to those of the land cover image in the SAR image coordinate system in the one-to-one manner. In this way, in the subsequent step of estimating the covariance matrix of the time-series SAR data set, statistics can be accurately performed on pixels with a same category marker as a central pixel in a window, and the overall calculation efficiency is also improved compared with the prior art.

S104: Estimate a covariance matrix of the time-series SAR data set at each spatial pixel position based on the land cover image in the SAR image coordinate system and the differential interferometric data set, and estimate and obtain an optimized time-series phase according to a preset maximum likelihood estimator for a time-series phase.

Specifically, a sliding window for each spatial pixel position of the image is established sequentially, a pixel with a same attribute as a preset reference pixel in the sliding window is marked sequentially based on the land cover image in the SAR image coordinate system, so as to sequentially collect statistics on pixels with a same category marker as a central pixel in the sliding window, and the covariance matrix is calculated.

Specifically, the optimized time-series phase is estimated and obtained according to the preset maximum likelihood estimator for the time-series phase, namely, $$\hat{\theta} = \arg\min_{\theta}\{\Re(\xi^H(|\Sigma|^{-1}\circ\Sigma)\xi)\},$$

where $\xi=e^{j\theta}$. In the above formula, $\hat{\theta}$ represents the optimized time-series phase, $\theta$ represents a truth of the time-series phase, $\Re(\cdot)$ represents a real part operator, e represents a natural constant, j represents an imaginary number unit, H represents conjugate transposition, and $\Sigma$ represents the covariance matrix of the time-series SAR data set.

It should be noted that an L-looks differential interferogram is defined as $$\text{if } g_{i,k} = \frac{1}{L}\sum_{l=1}^{L} s_i(l)\cdot s_k^*(l)\cdot e^{-j\phi_{i,k}^{topo}},$$

where $s_i$ and $s_k$ represent $i^{th}$ and $k^{th}$ SLC images respectively, * represents a conjugate operator, L represents a total quantity of looks, l represents an $l^{th}$ look, j represents an imaginary number unit, and $\phi_{i,k}^{topo}$ represents a terrain phase compensation term. In this embodiment, $\phi_{i,k}^{topo}$ can be obtained from set parameters of Sentinel-1 and the preset DEM. In this embodiment, if SAR intensity is not considered, the L-looks differential interferogram is simplified as $$\text{if } g_{i,k} = \frac{1}{L}\sum_{l=1}^{L} \frac{s_i(l) \cdot s_k^*(l) \cdot e^{-j\phi_{i,k}^{topo}}}{|s_i(l)| \cdot |s_k(l)|} = \frac{1}{L}\sum_{l=1}^{L} e^{j(\phi_{i,k}(l) - \phi_{i,k}^{topo})},$$

where $\phi_{i,k}$ represents an original phase. In this embodiment, a covariance matrix of a single-look time-series SAR data set is defined as $$\Sigma_0 = \begin{bmatrix} 1 & \eta_{1,2} & \cdots & \eta_{1,N} \\ \eta_{2,1} & 1 & \cdots & \eta_{2,N} \\ \vdots & \vdots & \ddots & \vdots \\ \eta_{N,1} & \eta_{N,2} & \cdots & 1 \end{bmatrix},$$

where the off-diagonal element $$\eta_{i,k} = \frac{\sum_{m=1}^{M} e^{j\phi_{i,k}(m)} \cdot e^{-j\phi_{i,k}^{topo}}}{M}$$

is a differential interferogram. $\eta_{i,k}$ is converted into $$\eta_{i,k} = \frac{\sum_{q=1}^{Q} \sum_{l=1}^{L} e^{j\phi_{i,k}(l,q)} \cdot e^{-j\phi_{i,k}^{topo}}}{L \cdot Q} = \frac{1}{Q}\sum_{q=1}^{Q} \text{ if } g_{i,k}(q),$$

where M=L·Q. The above formula shows that any element of the covariance matrix of the single-look time-series SAR data set can be obtained based on the L-looks differential interferogram. A covariance calculation result obtained for an SLC image set by using M samples is the same as that obtained for the L-looks differential interferogram by using Q samples, thereby greatly reducing memory space of input data. In addition, $\Sigma_0$ is a symmetric matrix with a total of n(n−1)/2 off-diagonal elements, and any of them $\eta_{i,k}$ is a differential interferogram. Therefore, the covariance matrix $\Sigma_0$ of the time-series SAR data set can be obtained equivalently by using the L-looks differential interferograms.

Figure 3:
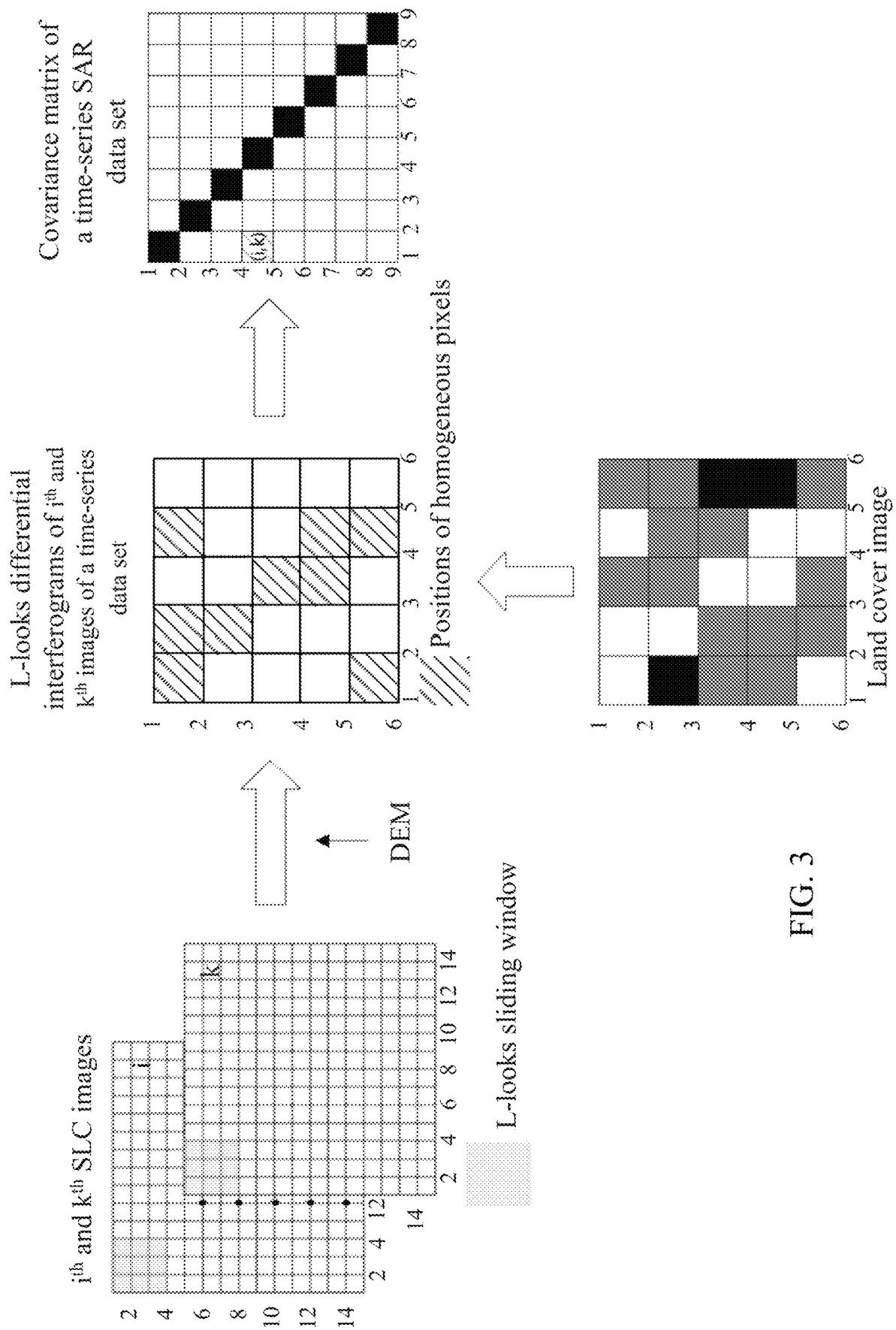
FIG. 3 is a schematic diagram of covariance matrix estimation in an optimization method for an InSAR time-series phase according to an embodiment of the present disclosure.

Referring to FIG. 3, FIG. 3 is a schematic diagram of covariance matrix estimation of the time-series SAR data set under the assistance of the land cover image in the SAR image coordinate system. The L-looks differential interferogram is first obtained by means of L-looks sliding windows of $i^{th}$ and $k^{th}$ images of a time-series data set, homogeneous pixels are then selected based on the land cover image in the SAR image coordinate system, and $i^{th}$ and $k^{th}$ elements in the covariance matrix are estimated.

It can be understood that, in the step of estimating the covariance matrix of the time-series SAR data set, without using a traditional step of processing distributed target data, in which statistically homogeneous samples are selected in the sliding window in single-look data, a neighborhood pixel with a same ground object category as the reference pixel in a current sliding window is marked by using the land cover image in the SAR image coordinate system, and pixels with a same category marker, namely, the homogeneous pixels, are used to estimate each element of the covariance matrix, which greatly improves operation efficiency and has obvious advantages in efficient operation.

It should be noted that as a parameter estimation method, maximum likelihood estimation estimates an approximate value of a parameter by conducting a plurality of tests, observing results, and using the results. In this embodiment, the optimized time-series phase $\hat{\theta}$ is estimated by using the covariance matrix of the time-series SAR data set.

It can be understood that based on the preset maximum likelihood estimator for the time-series phase and the covariance matrix of the time-series SAR data set, the optimized time-series phase can be accurately estimated, thereby further improving accuracy of SAR time-series phase optimization.

Referring to FIG. 2, FIG. 2 is a schematic flowchart of an optimization method for an InSAR time-series phase according to an embodiment of the present disclosure. An L-looks SAR intensity data set and an L-looks interferometric data set are obtained by performing registration and L-looks processing on the obtained time-series SAR data set, and the digital elevation and the land cover image in the SAR coordinate system are obtained by performing registration and geocoding on both the DEM and the land cover image. The differential operation is performed on the digital elevation in the SAR coordinate system and the L-looks interferometric data set to obtain an L-looks differential interferometric data set. With the assistance of the land cover image in the SAR coordinate system, L-looks targets of a same type are selected and covariance matrix estimation is performed, and the optimized time-series phase is obtained by performing maximum likelihood estimation based on the covariance matrix.

Figure 4:
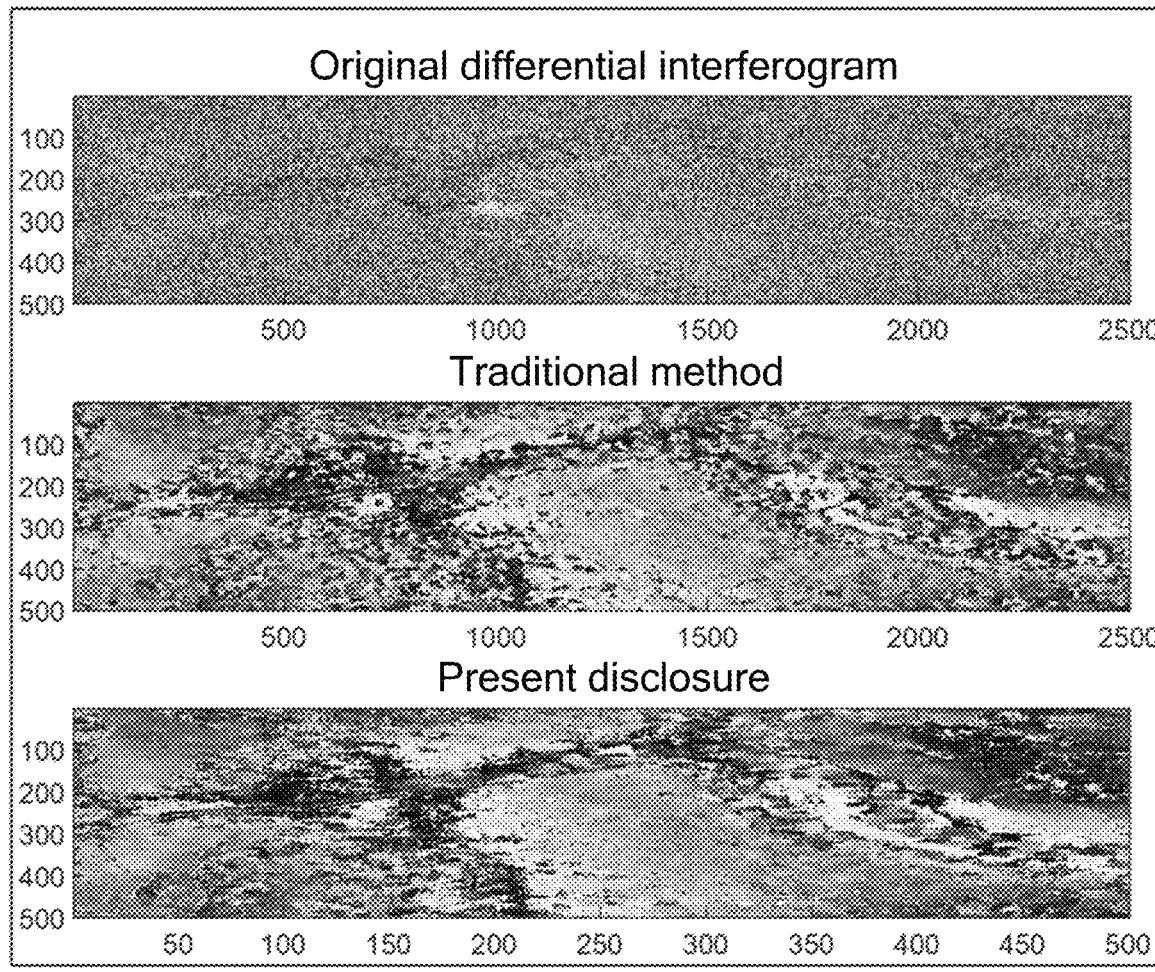
FIG. 4 compares effects of an optimization method for an InSAR time-series phase according to an embodiment of the present disclosure, an original differential interferogram, and an existing method.
Figure 5:
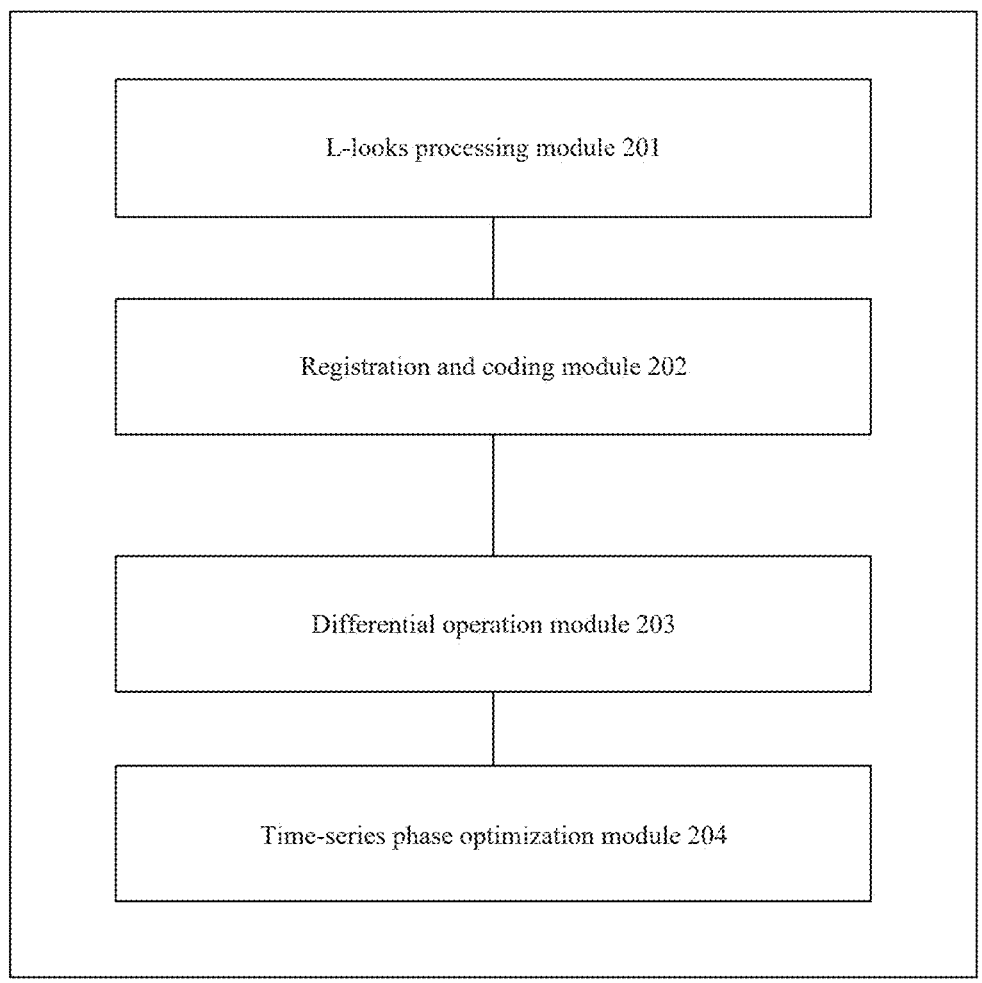
FIG. 5 is a schematic diagram of an optimization apparatus for an InSAR time-series phase according to an embodiment of the present disclosure.

Referring to FIG. 4, FIG. 4 compares effects of another embodiment, an original differential interferogram, and an existing method. Both interferograms in the existing method and this embodiment of the present disclosure can effectively suppress noise and obtain a high signal-to-noise ratio phase. However, since this embodiment of the present disclosure sets L to 5 in a slant-range direction, an image size is five times smaller than the result obtained by using the traditional method. In this embodiment, a SLC data set of 21 images of Sentinel-1 in TOPS mode obtained in 2017, the DEM with resolution of 30 m in the Shuttle Radar Topography Mission (SRTM), and the global land cover image with resolution of 10 m and provided by the Environmental Systems Research Institute (ESRI) in 2020 are selected, and all data sets are registered and sampled to a 20 m grid. The time-series phase is estimated using the process in FIG. 3. In addition, the traditional method is adopted. The KS test method is used to select homogeneous samples for a data set in the case of the single look, and then a same likelihood estimator is used to estimate the time-series phase. In the process of estimating the covariance matrix, a 11*21 window is selected for the KS test. After performing data preprocessing based on L that is set to 5 in the slant-range direction, the method in the present disclosure uses a 11*11 window to estimate the covariance matrix, which is equivalent to an 11*55 estimation window in the case of the single look. Test results obtained by using software MATLAB2021a are shown in Table 1. Input of multi-looks data (namely, data obtained after L-looks processing) and output of parameters occupy about 17% of workspace in the case of the single look (978.73 M), namely, 169.98 M. This proves that using the multi-looked data can greatly reduce the memory space. When the land cover image in the SAR image coordinate system is available, sample selection takes only one minute, and the efficiency is 272 times that of the traditional method, which proves a capability of efficient operation and a potential of massive data processing of the method in this embodiment.

TABLE 1

Comparison of MATLAB workspace memory consumption and statistics and selection time for different methods

| | >> data size in workspace under L-looks: | | | >> data size in workspace under single-look: | |
|---|---|---|---|---|---|
| 1 | intfstack | 40.05M | 1 | intfstack | 200.27M |
| 2 | mlistack | 20.03M | 2 | mlistack | 100.14M |
| 3 | SHP_ml | 29.33M | 3 | SHP_sl | 277.76M |
| 4 | BoxCoh_ml | 20.03M | 4 | BoxCoh_sl | 100.14M |
| 5 | BoxPh_ml | 20.03M | 5 | BoxPh_sl | 100.14M |
| 6 | UbCoh_ml | 20.03M | 6 | UbCoh_sl | 100.14M |
| 7 | AdpPh_ml | 20.03M | 7 | AdpPh_sl | 100.14M |
| >> SHP_SelPoint operation completed in 1 min(s). | | | >> SHP_SelPoint operation completed in 272 min(s). | | |

This embodiment of the present disclosure has the following effects:

In this embodiment of the present disclosure, after the time-series SAR data set is obtained, L-looks processing is performed on the time-series SAR data set. Compared the state-of-the-art, the method in the present disclosure converts an existing SLC data set into an L-looks data set, such that workspace occupied for L-looks data input and parameter output is far less than that in the case of the single look, which can greatly reduce a volume of the data set; and estimates the covariance matrix of the time-series SAR data set based on the obtained land cover image in the SAR image coordinate system, which greatly improves operation efficiency and avoids the estimation through selection of the statistically homogeneous pixels by using the KS test in the prior art.

Embodiment 2

Correspondingly, the present disclosure further provides an optimization apparatus for an InSAR time-series phase, including an L-looks processing module 201, a registration and coding module 202, a differential operation module 203, and a time-series phase optimization module 204.

The L-looks processing module 201 is configured to obtain a time-series SAR data set, and perform registration and L-looks processing on the time-series SAR data set to obtain an L-looks intensity data set and an interferometric data set respectively.

Specifically, the L-looks processing module 201 is configured to obtain a time-series SAR data set with n time-series SAR single-look images, register the n time-series SAR single-look images, perform L-looks processing on the registered n time-series SAR single-look images, and obtain n SAR intensity images and n(n−1)/2 interferometric data sets, where n is a positive integer greater than 1.

The registration and coding module 202 is configured to take the L-looks intensity data set as a reference, obtain a preset DEM and a preset land cover image, perform registration and geocoding on the preset DEM to obtain a digital elevation in a SAR image coordinate system, and perform registration and geocoding on the preset land cover image to obtain a land cover image in the SAR image coordinate system.

Specifically, the registration and coding module 202 is configured to take the L-looks intensity data set as a reference, and use a preset cross-correlation maximization algorithm to co-register the preset DEM and the L-looks intensity data set, and then transform the DEM into a SAR image coordinate system to obtain the digital elevation; and analogously, perform registration and geocoding on the preset satellite orbit data information and the preset land cover image to obtain the land cover image in the SAR image coordinate system.

The differential operation module 203 is configured to perform a differential operation on the interferometric data set based on the digital elevation in the SAR image coordinate system to obtain a differential interferometric data set.

Specifically, the differential operation module 203 is configured to perform a differential operation on the n(n−1)/2 interferometric data sets based on the digital elevation in the SAR image coordinate system to obtain n(n−1)/2 differential interferometric data sets, where pixel positions of the differential interferometric data sets correspond to those of the land cover image in the SAR image coordinate system in a one-to-one manner.

The time-series phase optimization module 204 is configured to estimate a covariance matrix of the time-series SAR data set at each spatial pixel position based on the land cover image in the SAR image coordinate system and the differential interferometric data set, and estimate and obtain an optimized time-series phase according to a preset maximum likelihood estimator for a time-series phase.

Specifically, the time-series phase optimization module 204 is configured to establish a sliding window for each spatial pixel position of the image sequentially, marking a pixel with a same attribute as a preset reference pixel in the sliding window sequentially based on the land cover image in the SAR image coordinate system, so as to sequentially collect neighboring pixels with a same category marker as a central pixel in the sliding window, and calculate the covariance matrix.

Specifically, the time-series phase optimization module 204 is further configured to estimate and obtain the optimized time-series phase according to the preset maximum likelihood estimator for the time-series phase, namely, $$\hat{\theta} = \arg\min_{\theta}\{\Re(\xi^H(|\textstyle\sum|^{-1}\circ\textstyle\sum)\xi)\},$$

where $\xi=e^{j\theta}$. In the above formula, $\hat{\theta}$ represents the optimized time-series phase, $\theta$ represents a truth of the time-series phase, $\Re(\cdot)$ represents a real part operator, e represents a natural constant, j represents an imaginary number unit, H represents conjugate transposition, and $\Sigma$ represents the covariance matrix of the time-series SAR data set.

In this embodiment of the present disclosure, the L-looks processing module 201, the registration and coding module 202, the differential operation module 203, and the time-series phase optimization module 204 each may be one or more processors or chips that have a communication interface to implement a communications protocol, and may further include a memory, a relevant interface and system transmission bus, and the like if necessary. The one or more processors or chips execute program-related code to implement corresponding functions. Alternatively, the L-looks processing module 201, the registration and coding module 202, the differential operation module 203, and the time-series phase optimization module 204 may share an integrated chip or share a processor, a memory, and other devices. The shared processor or chip can execute program-related code to implement corresponding functions.

A person skilled in the art can clearly understand that, for convenience and brevity of description, reference can be made to corresponding processes in the foregoing method embodiments for specific working processes of the above-described modules. Details are not described herein again.

This embodiment has the following effects:

In this embodiment of the present disclosure, after the time-series SAR data set is obtained, L-looks processing is performed on the time-series SAR data set. Compared the prior art, the apparatus in the present disclosure converts an existing SLC data set into an L-looks data set, such that workspace occupied for L-looks data input and parameter output is far less than that in the case of a single look, which can greatly reduce a volume of the data set; and estimates the covariance matrix of the time-series SAR data set based on the obtained land cover image in the SAR image coordinate system, which greatly improves operation efficiency and avoids the estimation through selection of statistically homogeneous samples in the prior art. Therefore, the apparatus in the present disclosure has a capability of efficient operation and a potential of massive data processing.

The objectives, technical solutions, and beneficial effects of the present disclosure are further described in detail through the above specific embodiments. It should be understood that the above are merely some specific embodiments of the present disclosure, but are not intended to limit the protection scope of the present disclosure. It should be particularly noted that, any modifications, equivalent substitutions, improvements, and the like made by those skilled in the art within the spirit and principle of the present disclosure should be included within the protection scope of the present disclosure.

The invention claimed is:

1. An optimization method for an Interferometric Synthetic Aperture Radar (InSAR) time-series phase, comprising:
   obtaining a time-series SAR data set, and performing registration and L-looks processing on the time-series SAR data set to obtain an L-looks intensity data set and an interferometric data set respectively by a processor;
   taking the L-looks intensity data set as a reference, obtaining a preset digital elevation model (DEM) and a preset land cover image, performing registration and geocoding on the preset DEM to obtain a digital elevation in a SAR image coordinate system, and performing registration and geocoding on the preset land cover image to obtain a land cover image in the SAR image coordinate system by the processor;
   performing a differential operation on the interferometric data set based on the digital elevation in the SAR image coordinate system to obtain a differential interferometric data set by the processor; and
   estimating a covariance matrix of the time-series SAR data set at each spatial pixel position based on the land cover image in the SAR image coordinate system and the differential interferometric data set, estimating and obtaining an optimized time-series phase according to a preset maximum likelihood estimator for a time-series phase, and obtaining a ground deformation monitoring result based on the optimized time-series phase by the processor.

2. The optimization method for an InSAR time-series phase according to claim 1, wherein the obtaining a time-series SAR data set, and performing registration and L-looks processing on the time-series SAR data set to obtain an L-looks intensity data set and an interferometric data set respectively specifically comprises:
   obtaining a time-series SAR data set with n time-series SAR single-look images, registering the n time-series SAR single-look images, performing L-looks processing on the registered n time-series SAR single-look images, and obtaining n SAR intensity images and n(n−1)/2 interferometric data sets, wherein n is a positive integer greater than 1.

3. The optimization method for an InSAR time-series phase according to claim 1, wherein the taking the L-looks intensity data set as a reference, obtaining a preset DEM and a preset land cover image, performing registration and geocoding on the preset DEM to obtain a digital elevation in a SAR image coordinate system, and performing registration and geocoding on the preset land cover image to obtain a land cover image in the SAR image coordinate system specifically comprises:
   taking the L-looks intensity data set as the reference, and using a preset cross-correlation maximization algorithm to co-register the preset DEM and the L-looks intensity data set, and then transform the DEM into a SAR image coordinate system to obtain the digital elevation; and analogously, perform registration and geocoding on the preset satellite orbit data information and the preset land cover image to obtain the land cover image in the SAR image coordinate system.

4. The optimization method for an InSAR time-series phase according to claim 2, wherein the performing a differential operation on the interferometric data set based on the digital elevation in the SAR image coordinate system to obtain a differential interferometric data set specifically comprises:
   performing a differential operation on the n(n−1)/2 interferometric data sets based on the digital elevation in the SAR image coordinate system to obtain n(n−1)/2 differential interferometric data sets, wherein pixel positions of the differential interferometric data sets correspond to those of the land cover image in the SAR image coordinate system in a one-to-one manner.

5. The optimization method for an InSAR time-series phase according to claim 4, wherein the estimating a covariance matrix of the time-series SAR data set at each spatial pixel position based on the land cover image in the SAR image coordinate system and the differential interferometric data set specifically comprises:
   establishing a sliding window for each spatial pixel position of the image sequentially, marking a pixel with a same attribute as a preset reference pixel in the sliding window sequentially based on the land cover image in the SAR image coordinate system, so as to sequentially collect statistics on pixels with a same category marker as a central pixel in the sliding window, and calculating the covariance matrix.

6. The optimization method for an InSAR time-series phase according to claim 1, wherein the estimating and obtaining an optimized time-series phase according to a preset maximum likelihood estimator for a time-series phase specifically comprises:
   estimating and obtaining the optimized time-series phase according to the preset maximum likelihood estimator for the time-series phase, namely, $$\hat{\theta} = \operatorname*{argmin}_{\theta} \{\Re(\xi^H(|\Sigma|^{-1} \circ \Sigma)\xi)\},$$

wherein $\hat{\xi}=e^{j\hat{\theta}}$;

wherein $\hat{\theta}$ represents the optimized time-series phase, $\theta$ represents a truth of the time-series phase, $\Re(\cdot)$ represents a real part operator, e represents a natural constant, j represents an imaginary number unit, H represents conjugate transposition, and $\Sigma$ represents the covariance matrix of the time-series SAR data set.

7. An optimization apparatus for an InSAR time-series phase, comprising an L-looks processing module, a registration and coding module, a differential operation module, and a time-series phase optimization module, wherein the L-looks processing module is a processor configured to obtain a time-series SAR data set, and perform registration and L-looks processing on the time-series SAR data set to obtain an L-looks intensity data set and an interferometric data set respectively;

the registration and coding module is a processor configured to take the L-looks intensity data set as a reference, obtain a preset DEM and a preset land cover image, perform registration and geocoding on the preset DEM to obtain a digital elevation in a SAR image coordinate system, and perform registration and geocoding on the preset land cover image to obtain a land cover image in the SAR image coordinate system;

the differential operation module is a processor configured to perform a differential operation on the interferometric data set based on the digital elevation in the SAR image coordinate system to obtain a differential interferometric data set; and the time-series phase optimization module is a processor configured to estimate a covariance matrix of the time-series SAR data set at each spatial pixel position based on the land cover image in the SAR image coordinate system and the differential interferometric data set, estimate and obtain an optimized time-series phase according to a preset maximum likelihood estimator for a time-series phase, and obtain a ground deformation monitoring result based on the optimized time-series phase.

8. The optimization apparatus for an InSAR time-series phase according to claim 7, wherein when configured to obtain a time-series SAR data set, and perform registration and L-looks processing on the time-series SAR data set to obtain an L-looks intensity data set and an interferometric data set respectively, the L-looks processing module is specifically configured to:

obtain a time-series SAR data set with n time-series SAR single-look images, register the n time-series SAR single-look images, perform L-looks processing on the registered n time-series SAR single-look images, and obtain n SAR intensity images and n(n−1)/2 interferometric data sets, wherein n is a positive integer greater than 1.

9. The optimization apparatus for an InSAR time-series phase according to claim 8, wherein when configured to perform a differential operation on the interferometric data set based on the digital elevation in the SAR image coordinate system to obtain a differential interferometric data set, the differential operation module is specifically configured to:

perform a differential operation on the n(n−1)/2 interferometric data sets based on the digital elevation in the SAR image coordinate system to obtain n(n−1)/2 differential interferometric data sets, wherein pixel positions of the differential interferometric data sets correspond to those of the land cover image in the SAR image coordinate system in a one-to-one manner.

10. The optimization apparatus for an InSAR time-series phase according to claim 9, wherein when configured to estimate a covariance matrix of the time-series SAR data set at each spatial pixel position based on the land cover image in the SAR image coordinate system and the differential interferometric data set, the time-series phase optimization module is specifically configured to:

establish a sliding window for each spatial pixel position of the image sequentially, mark a pixel with a same attribute as a preset reference pixel in the sliding window sequentially based on the land cover image in the SAR image coordinate system, so as to sequentially collect statistics on pixels with a same category marker as a central pixel in the sliding window, and calculate the covariance matrix.

* * * * *